US007146325B2

(12) United States Patent
Yamakawa et al.

(10) Patent No.: US 7,146,325 B2
(45) Date of Patent: Dec. 5, 2006

(54) SALES DATA PROCESSING SYSTEM, PORTABLE ELECTRONIC TERMINAL, AND HOME DELIVERY RECEIVING METHOD

(75) Inventors: Masato Yamakawa, Numazu (JP); Masanori Takeuchi, Shizuoka (JP); Yoshiaki Gomi, Shizuoka (JP); Masaaki Makino, Numazu (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 604 days.

(21) Appl. No.: 10/079,592

(22) Filed: Feb. 22, 2002

(65) Prior Publication Data

US 2002/0116217 A1 Aug. 22, 2002

(30) Foreign Application Priority Data

Feb. 22, 2001 (JP) ............................. 2001-046315

(51) Int. Cl.
*G06Q 99/00* (2006.01)
(52) U.S. Cl. ............................................. 705/1; 705/21
(58) Field of Classification Search .................... 705/1, 705/16, 17, 21
See application file for complete search history.

(56) References Cited

U.S. PATENT DOCUMENTS

| 6,026,375 | A  | * | 2/2000 | Hall et al. ............... | 705/26 |
| 6,085,170 | A  | * | 7/2000 | Tsukuda .................. | 705/26 |
| 6,587,835 | B1 | * | 7/2003 | Treyz et al. .............. | 705/14 |
| 6,601,038 | B1 | * | 7/2003 | Kolls ...................... | 705/14 |
| 6,763,336 | B1 | * | 7/2004 | Kolls ...................... | 705/44 |
| 2002/0007318 | A1 | * | 1/2002 | Alnwick ................. | 705/26 |
| 2002/0025796 | A1 | * | 2/2002 | Taylor et al. ............ | 455/406 |
| 2003/0088483 | A1 | * | 5/2003 | Moyer ..................... | 705/27 |
| 2004/0098740 | A1 | * | 5/2004 | Maritzen et al. ......... | 725/27 |
| 2004/0158492 | A1 | * | 8/2004 | Lopez et al. ............. | 705/14 |

FOREIGN PATENT DOCUMENTS

| JP | 5-210685 | 8/1993 |
| JP | 10-149326 | 6/1998 |
| JP | 11-53230 | 2/1999 |
| JP | 11-306249 | 11/1999 |
| JP | 2001-256513 | 9/2001 |
| JP | 2001-283117 | 10/2001 |

OTHER PUBLICATIONS

POS Terminal MAkers Seek Wireless Links to Cell Phones, American Banker, Dec. 2, 2000, New York New York, vol. 1, Issue 6, p. 1.*

* cited by examiner

*Primary Examiner*—John G. Weiss
*Assistant Examiner*—Jamisue A. Webb
(74) *Attorney, Agent, or Firm*—Oblon, Spivak, McClelland, Maier & Neustadt, P.C.

(57) ABSTRACT

The present invention permits a data related to a destination used in an order reception operation of a goods delivery service to be acquired from an address information stored in an address information file retained in a portable electronic terminal, thus leading to utilization of the address information stored in the address information file as the data related to the destination used in the order reception operation of the goods delivery service. Thereby, a manual input of addresses, etc., in a product sales data processing system can be saved. Accordingly, a store with installation of the sales data processing system will achieve shortening of operation time, improvement of work efficiency, and reduction of mistakes, and a customer who owns the portable electronic terminal will be able to enjoy enhancement of the convenience and serviceability.

10 Claims, 8 Drawing Sheets

HOME DELIVERY RECEPTION

BILL CODE: 76543210
XXXXXXXXXXXXX
TOLL LINE NO./LOCAL LINE NO.: 033409
DELIVERY DESTINATION: SHIBUYA-KU, TOKYO

| | |
|---|---|
| PLANNED DATE OF DELIVERY: | MARCH 30 (THURSDAY) MORNING× AFTERNOON● NIGHT● |
| DATE OF USE: | MARCH 30 (THURSDAY) |
| SIZE: | 2Kg OR LESS, 60cm OR LESS |
| BASIC CHARGE: | 4,000yen  DISCOUNT  2,000yen (GOING) 2,000yen (RETURNING) |
| SOLITARY ISLAND CHARGE: | 0yen |
| COVER CHARGE: | 2,000yen |
| | VINYL BAG FOR SNOW BOARD |

NUMBER OF RECEIPT OF PARCEL    NO. 999

PAYMENT AT DELIVERY SITE

BEFORE COLLECTION

CLASSIFICATION 32-10

YES

TOTAL CHARGE FOR PARCEL DELIVERY SERVICE :    6,000yen

PLEASE CONFIRM THE REGISTERED CONTENTS AND TRANSFER THEM TO A BILL.
IF THEY ARE CORRECT, MARK [YES]. IF THE SERVICE SHOULD BE STOPPED, MARK [STOP].

Buttons: PREVIOUS PAGE | NEXT PAGE | CANCEL | RETURN | STOP

Bottom buttons: INPUT OF CONFIRMATION OF PARCEL COLLECTION | INPUT OF THE NUMBER OF PARCEL | BAR CODE SCAN | INPUT OF DELIVERY CUSTOMER | INPUT OF SIZE DESIGNATION | INPUT OF DATE OF USE | INPUT OF COVER SELECTION | CONFIRM CONTENTS TRANSFER A BILL

Fig. 7

Fig. 8A
ADDRESS SELECTION SCREEN

Fig. 8B
ADDRESS CONFIRMATION SCREEN

Fig. 8C
ADDRESS TRANSMISSION SCREEN

SALES DATA PROCESSING SYSTEM, PORTABLE ELECTRONIC TERMINAL, AND HOME DELIVERY RECEIVING METHOD

CROSS REFERENCE TO RELATED APPLICATION

The present application is based on Japanese Priority Document P2001-046315 filed on Feb. 22, 2001, the content of which is incorporated herein by reference.

BACKGROUND OF THE INVENTION

1. Field of the Invention

The present invention relates to a data processing method, a data processing apparatus, and a portable electronic terminal, these method, apparatus and terminal are, for instance, utilized in a goods delivery method, a sales data processing system, and portable electronic terminal that are employed in stores, such as convenience stores, consigned for an order receiving operation of goods delivery service by a goods delivery service company.

2. Discussion of the Background

Chain stores that practice sales business, expanding stores in various places, make good use of the POS (Point of Sales) system and thereby collectively grasp the sales situations of each of the stores to make up the total sales strategies.

Here, the POS system as mentioned above includes, for example, multiple POS terminals that execute processing of various data, one store computer established in each of the multiple stores that executes processing of the various data received from the multiple POS terminals, and a host computer established in headquarters that executes processing of various data by receiving the various data from the store computers established in each of the multiple stores.

Now, the POS terminal of each store registers product sales data, etc., stores them sequentially, and sends the transaction data generated from the stored various data to the store computer of the same store after completing the registration processing. Then, the store computer of each store totalizes the transaction data received from the POS terminals of the same store, and sends the totalized transaction data to the host computer of the headquarters, at a predetermined regulated timing, for example, once a day.

By utilizing the POS system as such, each store is able to confirm the sales situation, and the headquarters is able to confirm collectively the sales situations of the multiple stores.

Incidentally, in this type of POS system, recently reception of order for goods delivery service utilizing the POS terminal at each store is practiced, by making a contract with a goods delivery service company. In other word, in this type of POS system, the POS terminal at each store registers the reception data of the goods delivery service in accordance with a request by a customer, and sends the reception data as the transaction data with the product sales data to the store computer. Then the host computer that received the transaction data from the store computer sends the transaction data of the goods delivery service to the goods delivery service company by a predetermined communication line. Then, the goods delivery service company can send a home delivery truck to the stores provided with the POS terminals that received goods delivery service orders, and the truck can receive the shipment stored at the store counters and deliver them to the customers.

However, in the existing system, customers have to fill up a slip of the goods delivery service company with their phone numbers, addresses, etc. by hand. An operator of the POS terminal has to execute the receiving operation by manually inputting the necessary matters based on this slip of the goods delivery service company to the POS terminal, searching for an area code based on the address or the phone number, calculating a delivery charge based on this area code, etc.

However, such goods delivery service receiving operation is a comparably time consuming work for convenience stores, and can easily become an obstacle to other operations (especially, sales settlement operation, etc.). In addition, since it is a comparably time consuming work, it can easily induce operational mistakes by the operator.

SUMMARY OF THE INVENTION

The present invention has been made in view of these circumstances, and it is an object of the invention to provide a data processing method, a data processing apparatus, and a portable electronic terminal that achieves shortening of operation time, enhancement of work efficiency, and reduction of mistakes for the stores, and that improves serviceability for the customers.

The object of the present invention is achieved by the novel data processing method, data processing apparatus, and portable electronic terminal of the present invention.

According to the novel data processing method of the present invention, comprising the steps of: executing a data communication by establishing an access between a data processing apparatus for executing data processing with respect to goods delivery service and a portable electronic terminal storing address data which is capable of identifying address for the goods delivery service; transmitting the address data from the portable electronic terminal to the data processing apparatus when the data processing with respect to the goods delivery service is executed while the access between the data processing apparatus and the portable electronic terminal is established, the transmitted data identifying the address which the goods delivery service is requested; the data processing apparatus receiving the address data from the portable electronic terminal when the data processing with respect to the goods delivery service is executed while the access between the data processing apparatus and the portable electronic terminal is established; and executing data input processing with respect to the address data by using the received data.

According to the novel data processing apparatus of the present invention, the data processing apparatus includes, for executing the above data processing method of the present invention, data communication means for executing a data communication by establishing an access with a portable electronic terminal storing address data which is capable of identifying address for the goods delivery service; data reception means for receiving the address data from the portable electronic terminal through the data communication means when the data processing with respect to the goods delivery service is executed while the access between the data processing apparatus and the portable electronic terminal is established, the transmitted data identifying the address which the goods delivery service is requested; and objective execution means for executing data input processing with respect to the address data by using the received data.

According to the novel portable electronic terminal of the present invention, the portable electronic terminal includes, for executing the above data processing method of the present invention, data communication means for executing a data communication by establishing an access from a data processing apparatus executing data processing with respect to goods delivery service; an address data file storing address data which is capable of identifying address for the goods delivery service; and data transmission means for transmitting the address data through the data communication means when the data processing for the goods delivery service is executed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

The embodiment according to the invention will be explained based on FIG. 1 through FIG. 8. The home delivery order receiving system of the embodiment comprises a product sales data processing system and a cellular phone as the portable electronic terminal. This embodiment will describe one example that applies the POS (Point of Sale) terminals used in stores such as convenience stores consigned for a home delivery order receiving operation by a goods delivery service company to the product sales data processing system.

Figure 1:
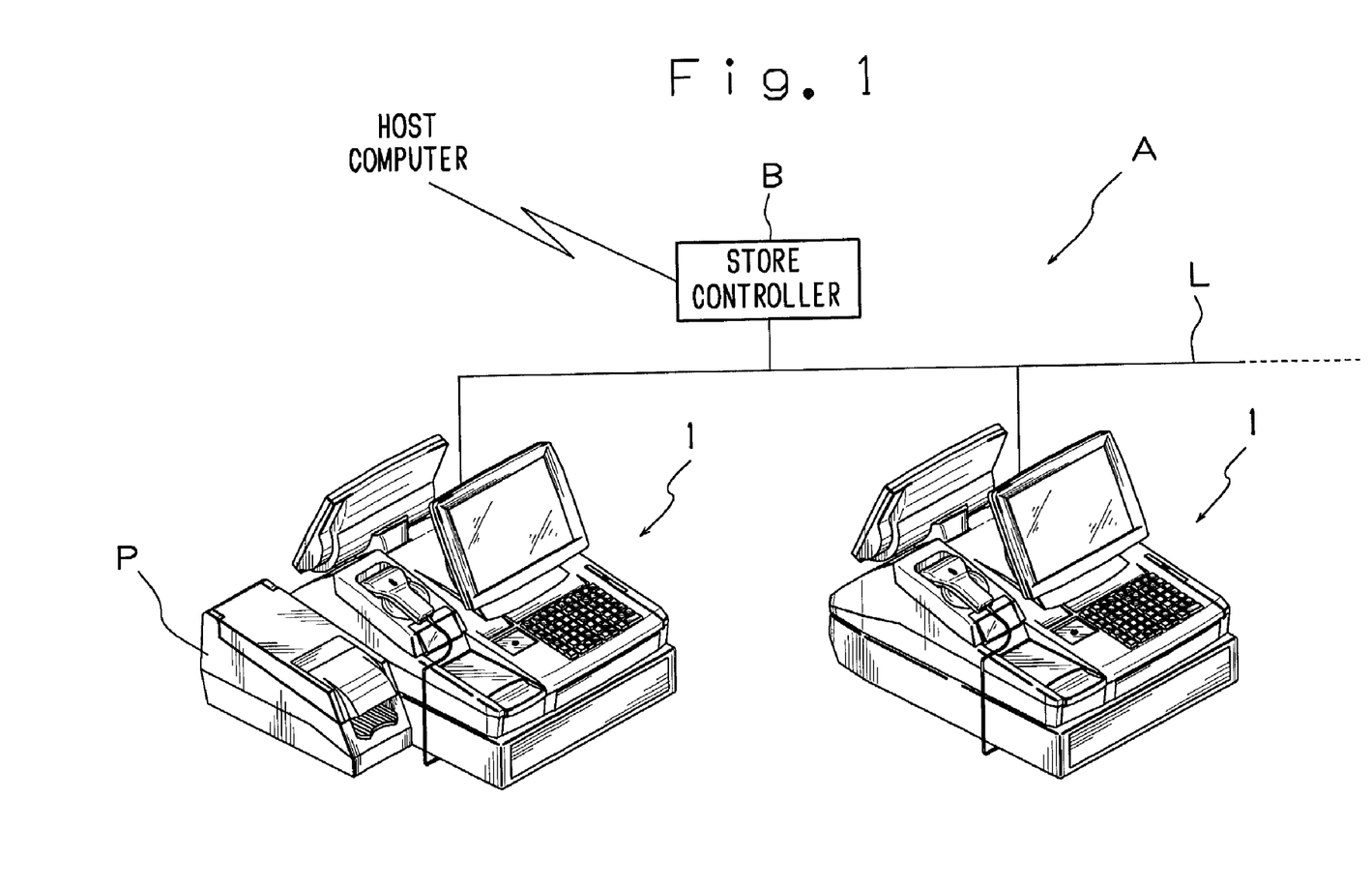
FIG. 1 is a schematic drawing, illustrating the POS system provided with POS terminals configuring the goods delivery service receiving system relating to the embodiment of the invention.

FIG. 1 illustrates a schematic drawing of a POS system A comprising POS terminals 1 that constitute the home delivery order receiving system of the embodiment. The POS system A comprises a store controller B, established in the back yard of a convenience store, and a plural POS terminals 1, established on cash registers of the same. The store controller B and the plural POS terminals 1 are connected to each other through a LAN (Local Area Network) cable L.

Since the technology is well known, a detailed explanation will be omitted except for the fact that the store controller B manages sales data from each POS terminal 1. Also, the store controller B is connected to a host computer of the headquarters, and the host computer of the headquarters manages data transmission to/from goods delivery service company, etc.

Figure 2:
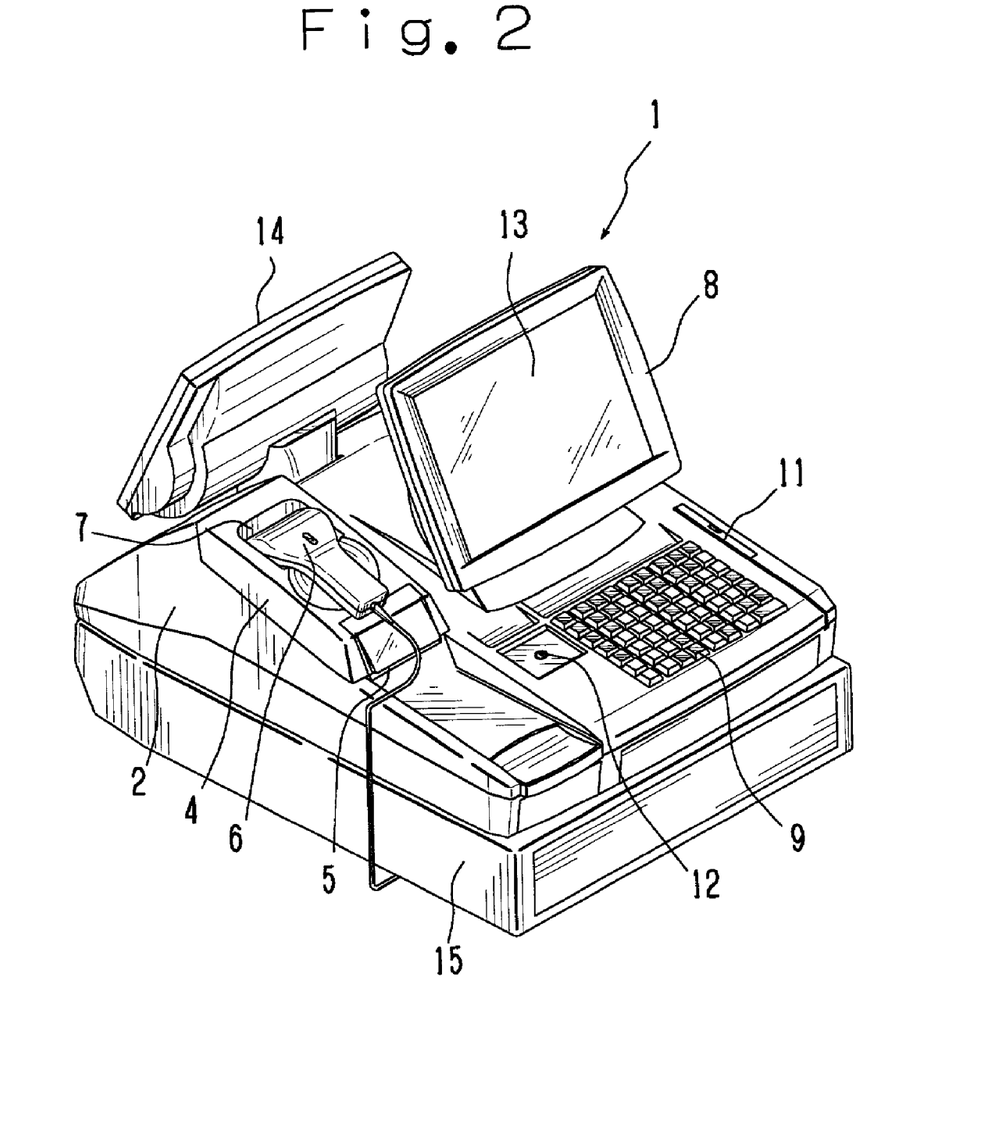
FIG. 2 is an external perspective view of the POS terminal.

Now, FIG. 2 illustrates a schematic perspective of the POS terminal 1. As shown in FIG. 2, on the left side viewed from an operator of the POS terminal 1, enclosed in a body case 2, a thermal printer 3 (refer to FIG. 3) is provided, which is housed inside a printer cover 4. On the printer cover 4, receipt aperture 5 is formed, from which receipts (not illustrated) printed by the thermal printer 3 are discharged. Also, on the top part of the printer cover 4, a bar code scanner 6 is mounted on a concave-formed scanner-placing unit 7, which optically reads product codes attached to the products. On the other hand, on the right side viewed from the operator of the POS terminal 1 are established a freely tiltable display 8 being an LCD (Liquid Crystal Display) that functions as a display device, a keyboard 9 on which various keys are assembled, a magnetic card insertion aperture 11 for inserting magnetic cards into a magnetic card reader 10 (refer to FIG. 3), and a mode key 12 that is operated and switched by a key not illustrated, etc.

Also, the display 8 has a touch panel 13 furnished thereon. The display 8 will exhibit the same function as the keyboard, by synchronizing the positional relation between the buttons, etc., displayed on the display 8 and the positional coordinates of the touch panel 13.

In addition, a customer side display 14 is provided on the back of the POS terminal 1, facing to a customer. The POS terminal 1 as such is mounted on a drawer 15 for use.

Figure 3:
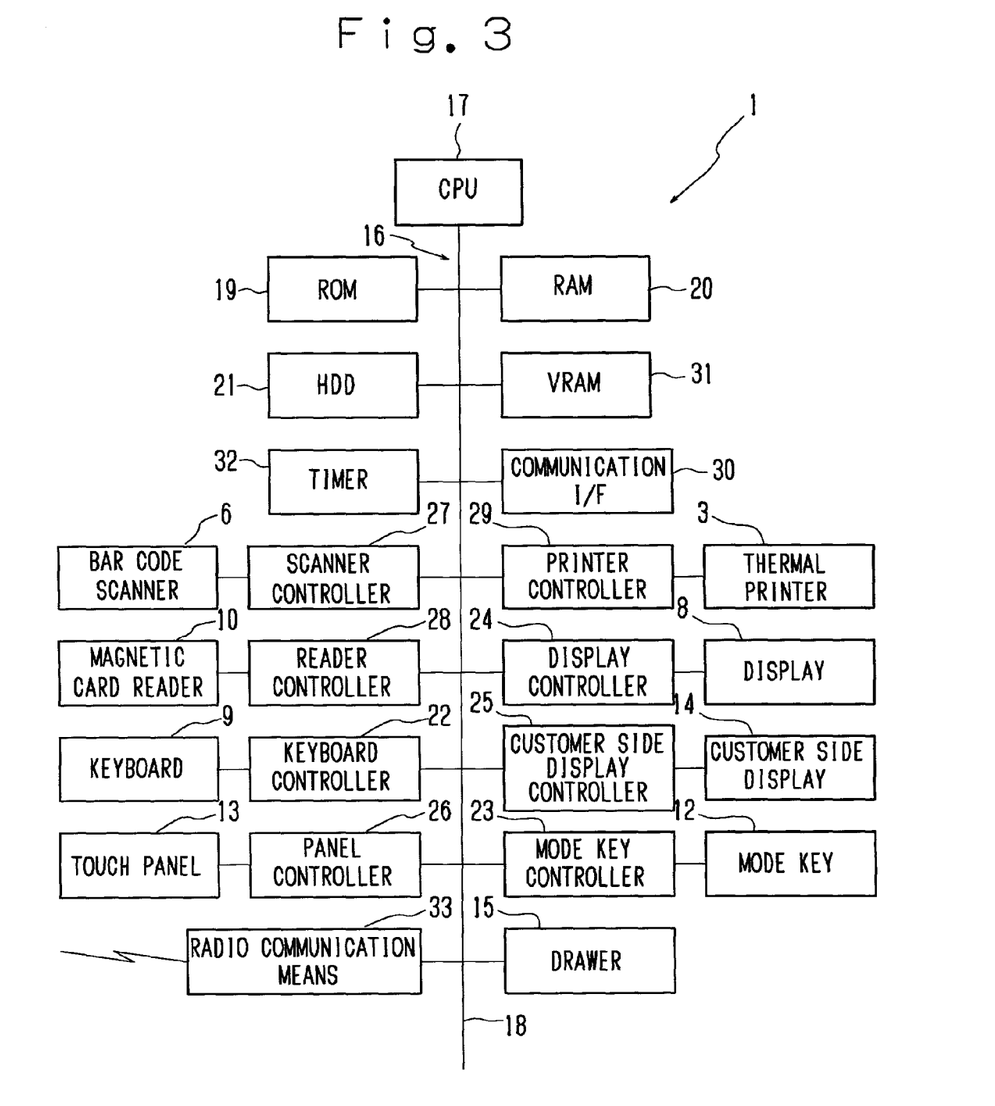
FIG. 3 is a block diagram illustrating the electrical connections between the units built in the POS terminal.

Next, the electric connection of the units built in the POS terminal 1 thus configured will be explained with reference to FIG. 3. As shown in FIG. 3, the POS terminal 1 incorporates a microcomputer 16, and the microcomputer 16 drives and controls each of the units. The microcomputer 16 includes a CPU (Central Processing Unit) 17 that controls each of the units intensively, to which are connected via a bus line 18 including address busses, data busses, etc., a ROM (Read Only Memory) 19 that stores fixed data such as startup programs in advance, a RAM (Random Access Memory) 20 that configures various buffers, such as sales buffer, print buffer, etc., and stores various data rewritably, and a timer 32 that clocks date and time. In addition, a VRAM (Video Random Access Memory) 31 is connected to the bus line 18, which develops display data, etc., with high speed.

Also, to the bus line 18 connected to the CPU 17 is connected a HDD (Hard Disk Drive) 21, which is a storage medium, and, the HDD 21 stores a control program for operating the microcomputer 16, and other various data files. The various data files include, for example, a product master file, a sales master file, and a goods delivery service related file, etc. Though not specifically illustrated, the product master file is provided with a file structure that stores and retains product names, unit prices, section codes, etc., in association with each of the product codes. The sales file is provided with a file structure that stores and retains the sales history of products such as sales details and sales amounts. Also, the goods delivery service related file includes, a home delivery order receiving file for storing and retaining information inputted during the home delivery order receiving processing being described later, and a fare file for beforehand storing and retaining information related to delivery fares in association with destination addresses and packages sizes, etc.

The control program stored in the HDD 21 is written into the RAM 20 at start-up time of the POS terminal 1, along with the product master file, etc., thus enabling the microcomputer 16 to drive and control each of the units. Next, the units to be driven and controlled by the microcomputer 16 will be explained.

The keyboard 9 is connected to the bus line 18 via a keyboard controller 22, and inputs signals corresponding to operated keys to the microcomputer 16 through the operation of the keyboard controller 22.

The mode key 12 is connected to the bus line 18 via a mode key controller 23, and inputs signals corresponding to switched positions to the microcomputer 16 through the operation of the mode key controller 23. The microcomputer 16 sets the operation mode of the POS terminal 1 to each operation mode such as registration mode, setting mode, adjustment mode, and inspection mode, in accordance with an output signal from the mode key 12.

The display 8 is connected to the bus line 18 via a display controller 24, and when a display data is inputted to the display controller 24 from the microcomputer 16, the display 8, driven by the display controller 24, displays the specified items.

The customer side display 14 is connected to the bus line 18 via a customer side display controller 25, and when a customer side display data is inputted to the customer side display controller 25 from the microcomputer 16, the customer side display 14, driven by the customer side display controller 25, displays the specified items.

The touch panel 13 is connected to the bus line 18 via panel controller 26, and through the operation of the panel controller 26, the tough panel 13 acquires a coordinate data in terms of the XY coordinate by recognizing a position on the panel touched by an operator, and outputs a signal corresponding to the acquired coordinate data to the microcomputer 16. When the signal is inputted to the microcomputer 16, the microcomputer 16 executes a specified processing based on this signal.

The bar code scanner 6 is connected to the bus line 18 via a scanner controller 27, and transmits the read product code data to the microcomputer 16 through the operation of the scanner controller 27.

The magnetic card reader 10 is connected to the bus line 18 via a reader controller 28, and outputs information stored on a magnetic card to the microcomputer 16 through the operation of the reader controller 28.

Also, the thermal printer 3 built in the POS terminal 1 is connected to the bus line 18 via a printer controller 29, and is driven and controlled by the microcomputer 16. Further, this thermal printer 3 has a cutter unit (not illustrated) built in, which is driven and controlled by the microcomputer 16. Thereby, the thermal printer 3 displays a function as a receipt printer, by printing out necessary items for a receipt on a long piece of receipt paper not illustrated, cutting and discharging the receipt from the receipt aperture 5.

Further, in the POS terminal 1, a communication I/F 30 that sends and receives data by connecting the other POS terminals 1 and the store controller B, etc., via the LAN cable L is connected to the bus line 18, which is driven and controlled by the microcomputer 16. Also, the drawer unit 15 established separately from the POS terminal 1 is also driven and controlled by the microcomputer 16.

In addition, the POS terminal 1 is furnished with a radio communication means 33, which is connected to the bus line 18, and is driven and controlled by the microcomputer 16. This radio communication means 33 enables the sending and receiving of data and programs between other devices incorporating the radio communication means, by the control of the microcomputer 16. Here, an access between the devices incorporating the radio communication means being established, a data communication means for executing data communication is implemented.

Figure 4:
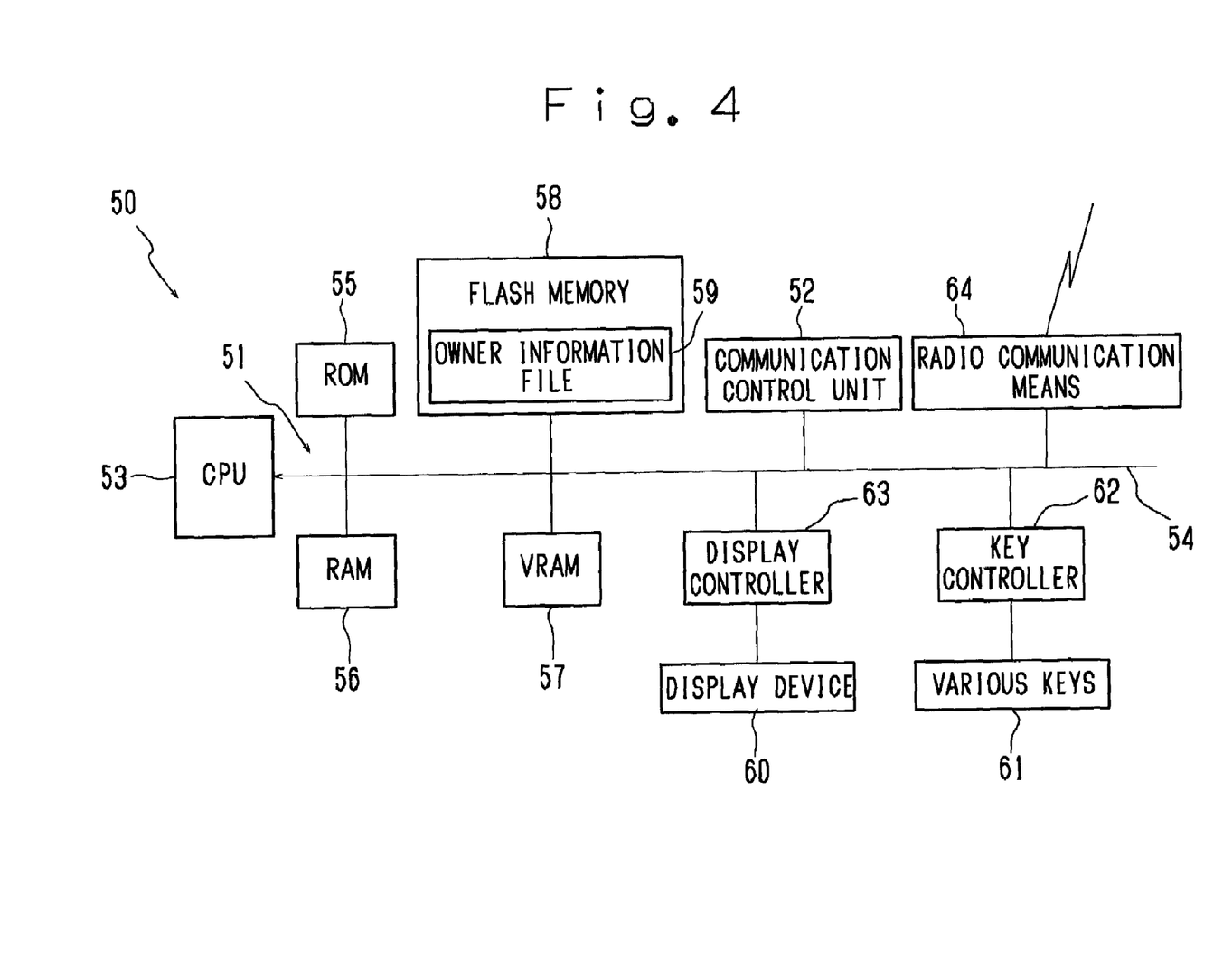
FIG. 4 is a block diagram illustrating the electrical connections between the units built in a cellular phone.

Next, a cellular phone 50 will be explained with reference to FIG. 4, which configures the home delivery order receiving system of this embodiment along with the POS system A. With regard to the appearance, etc., of the cellular phone 50 relating to the embodiment, there is not any difference at all from the well-known, therefore the explanation of thereof will be omitted. As shown in FIG. 4, the cellular phone 50 is provided with microcomputer 51, and the microcomputer 51 drives and controls each of the units, such as a communication control unit 52, a display unit 60, various keys 61, etc., which displays a telephone function. The microcomputer 51 includes a CPU 53 that controls each unit intensively, which is connected via a bus line 54 to a ROM 55 that beforehand stores fixed data such as a control program to operate the microcomputer 51, and to a RAM 56 that stores various data rewritably to function as a work area. In addition, the bus line 54 is connected to a VRAM (Video Random Access Memory) 57, which develops display data, etc., with high speed, and to a nonvolatile flash memory 58. The flash memory 58 holds an address book 59, which writes multiple addresses information including phone numbers and addresses, etc., of the owner and acquaintances.

The control program stored in the ROM 55 is written into the RAM 56 at the startup time of the cellular phone 50, whereby the microcomputer 51 becomes able to drive and control each of the units. The units driven and controlled by the microcomputer 51 will be explained hereunder.

The various keys 61 is connected to the bus line 54 via a key controller 62, and inputs a signal corresponding to each operated key 61, through the operation of the key controller 62.

The display device 60 is connected to the bus line 54 via a display controller 63, and when a display data from the microcomputer 51 is inputted to the display controller 63, the display device 60, driven by the display controller 63, displays an image based on the display data.

Also, the cellular phone 50 is provided with a radio communication means 64. The radio communication means 64 is connected to the bus line 54 and is driven and controlled by the microcomputer 51. The cellular phone 50 is able to send and receive data and programs to/from the other devices incorporating the data communication means 64, by the control of the microcomputer 51. Here, an access between the devices incorporating the radio communication means for executing data communication is implemented.

Now, in the POS terminal 1 relating to the embodiment, when one access from one cellular phone 50 is established, the other accesses from the other cellular phones 50 are excluded. This is to prevent an incorrect data from being sent to the POS terminal 1, by establishing one-to-one data communication between the cellular phone 50 and the POS terminal 1. Further, in the POS terminal 1 relating to the embodiment, the accesses from the cellular phones 50 are limited to a given business menu operation time. This is to prevent fraudulent accesses from the cellular phones 50 to the POS terminal 1.

In this configuration, of the functions that the home delivery order receiving system relating to the embodiment exhibits, distinctive functions will be explained hereunder. Here, on the premise that the registration mode is set by the switching operation of the mode key 12 of the POS terminal 1, the home delivery order receiving process executed by the microcomputer 16 of the POS terminal 1 will be explained with reference to FIG. 5.

Figure 5:
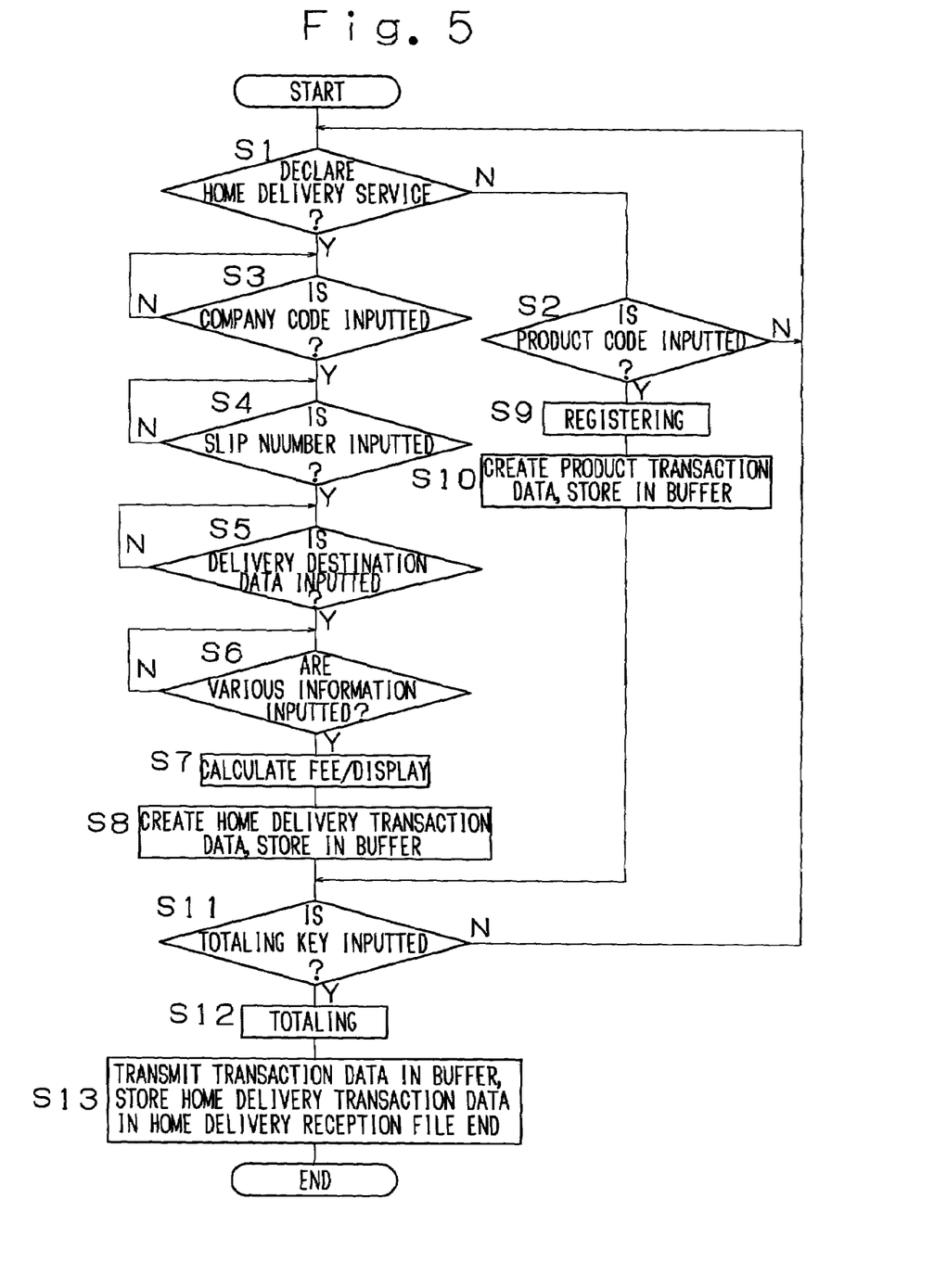
FIG. 5 is a schematic flow chart illustrating a goods delivery service reception processing.

As shown in FIG. 5, the microcomputer 16 of the POS terminal 1 executes a registration processing of a home delivery order reception data, when it detects a key input by a goods delivery service handling key (not illustrated) on the keyboard 9 during the registration processing (Y at step S1). When it detects a key input of a product code from the keyboard 9 or the bar code scanner 6 (Y at step S2), it will execute the registration processing of the sales data of the product.

Figure 6:
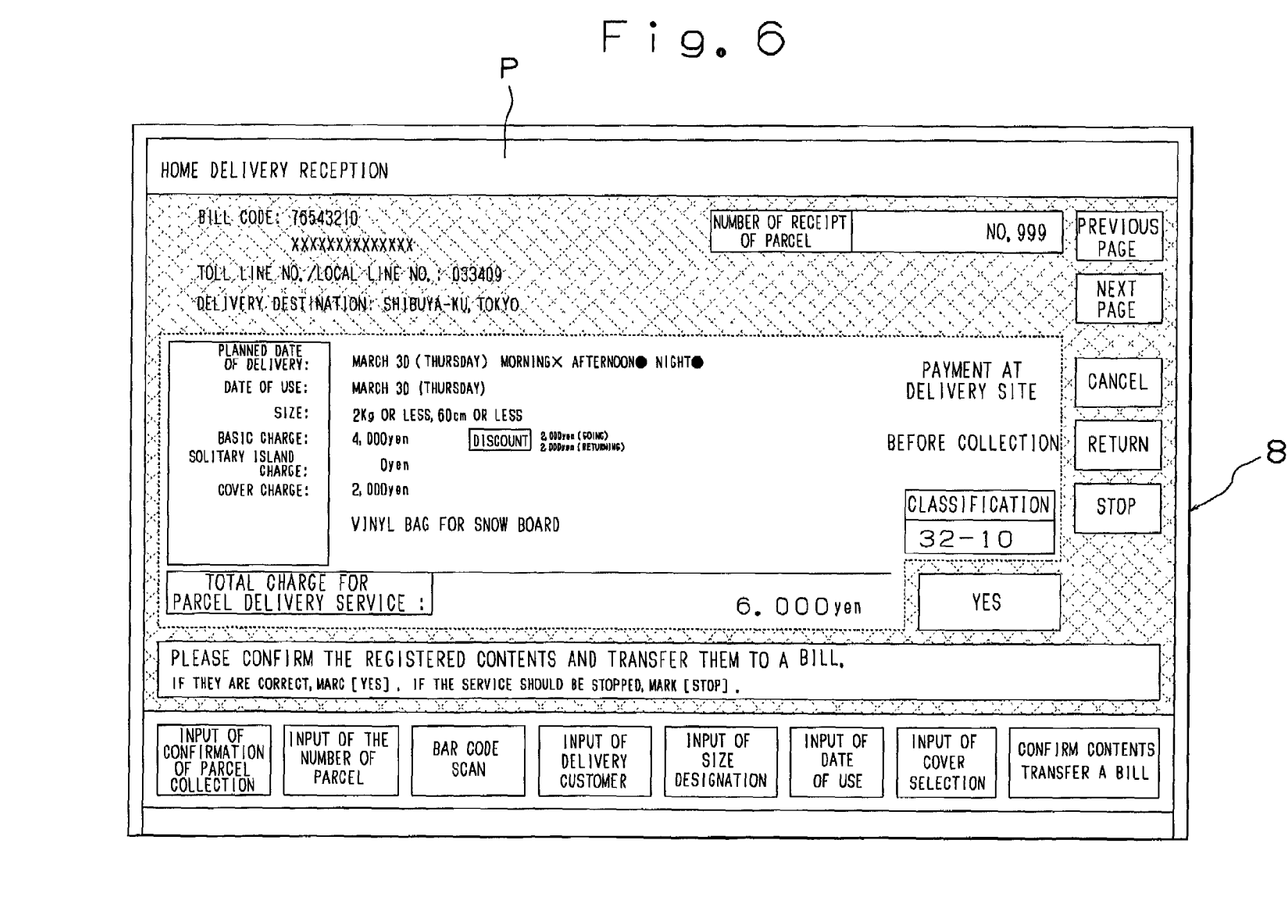
FIG. 6 is a front view illustrating a goods delivery service reception screen displayed on the POS terminal.

Next, the processing when the key input from the goods delivery service handling key (Y at step S1) is detected will be explained. Here, when the key input from the goods delivery service handling key (Y at step S1) is detected, the display 8 of the POS terminal 1 displays a home delivery order reception screen P as shown in FIG. 6. This home delivery order reception screen P is used for transferring fares, etc., into a slip (not illustrated) of the goods delivery service company.

When executing the registration processing of the home delivery order reception data with the POS terminal 1, a customer fills in the name, phone number, address, etc., of the destination into the slip of the home delivery company by hand, brings it to the store, where the clerk reads and scans the bar code attached to the slip with the bar code scanner 6, sequentially inputting a company code and a slip number included on the bar code (steps S3, and S4). This enables the association of information concerning the package that will be delivered being inputted later on, with the slip number.

Next, proceeding to step S5, the microcomputer 16 waits for the input of sending data. The input of the sending data can be done in a traditional manner from the keyboard 9 or the touch panel 13. However, the home delivery order receiving system relating to the embodiment makes the input executable by the radio communication between the POS terminal 1 and the cellular phone 50.

Figure 7:
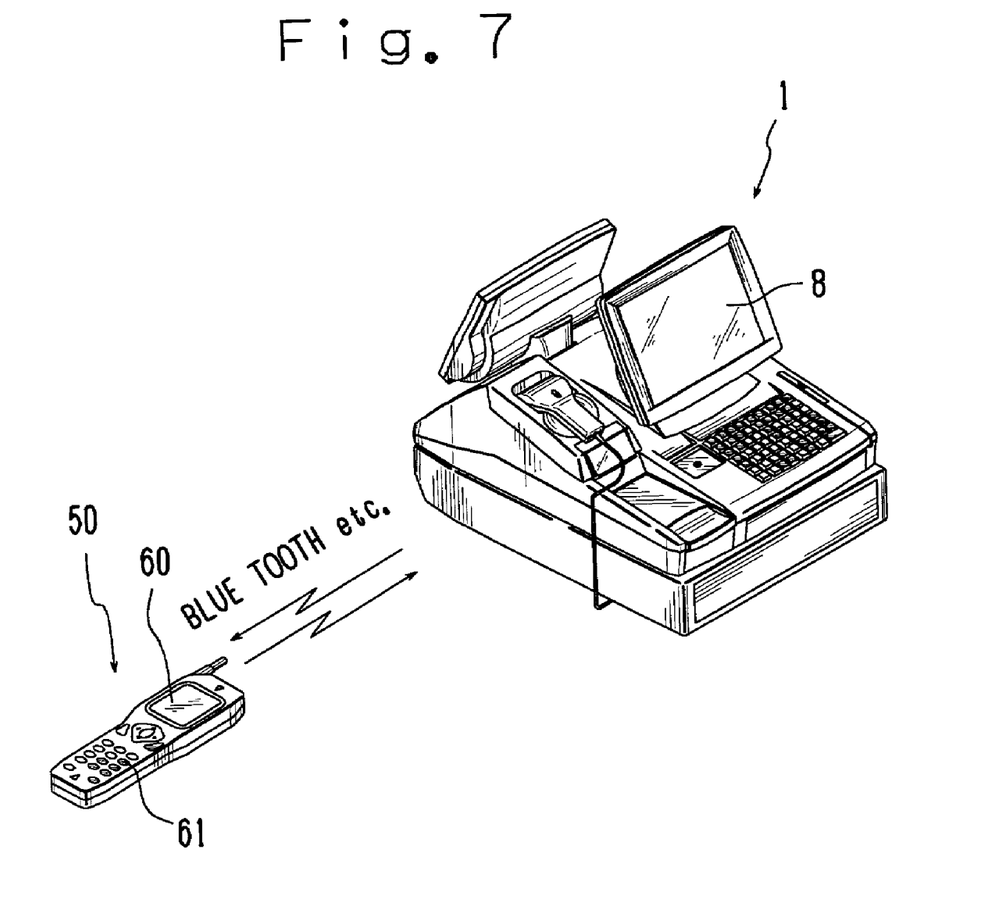
FIG. 7 is an explanatory chart illustrating a data communication between the POS terminal and the cellular phone.
Figure 8A:
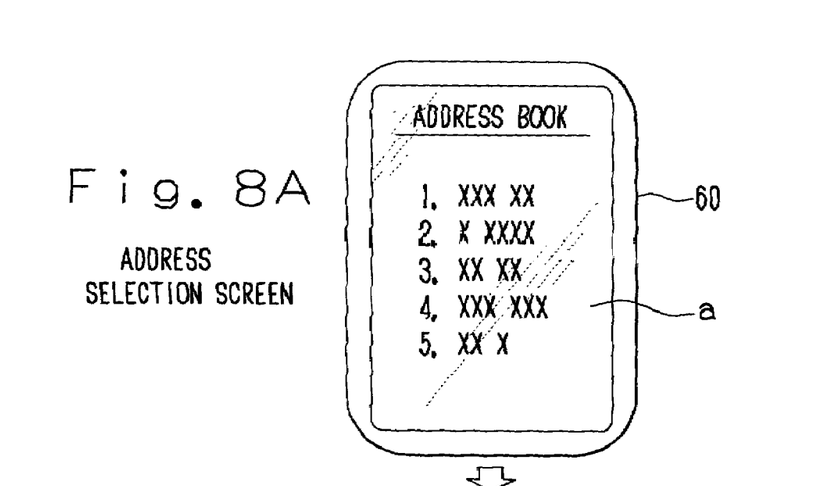
FIG. 8(A) is a front view illustrating an address search screen displayed on a display of the cellular phone.

As shown in FIG. 7, the POS terminal 1 and the cellular phone 50 are able to send and receive data or programs through the radio communication of the radio communication means 33 and the radio communication means 64 (data communication step and data communication means). To be more precise, after the POS terminal 1 determines the cellular phone 50 owned by the customer of the goods delivery service, it sends a program (for example, JAVA applet, etc.) to the concerned cellular phone 50, and displays an address search screen a on the display device 60 of the cellular phone 50 as illustrated in FIG. 8(A). Here, a program transmission step (a program transmission means) for search screen display is executed. At the same time, first sub-step (firs means) for the cellular phone 50 receiving the program from the POS terminal 1 is also executed on the cellular phone 50.

Also, the address information displayed on the address search screen a is stored in the address book 59. In other words, a customer that requested the goods delivery service will be operating the cellular phone 50 that displays the address search screen a on the display device 60 to send the data through the radio communication to the POS terminal 1.

Figure 8B:
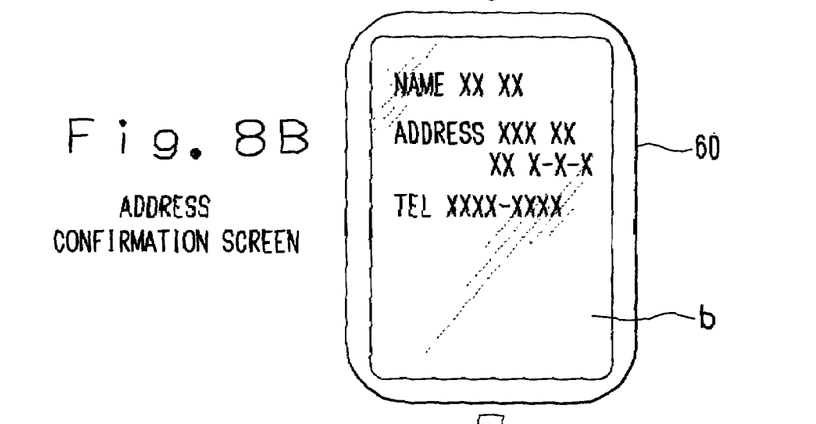
FIG. 8(B) is a front view illustrating an address confirmation screen displayed on a display of the cellular phone; and, FIG. 8(C) is a front view illustrating an address transmission screen displayed on a display of the cellular phone.

When a specific address information (here, the destination of the delivery) is selected (data selection means) with the key operation of the keys 61 of the cellular phone 50 by the customer, an address confirmation screen b, as illustrated in FIG. 8(B) is displayed on the display device 60 of the cellular phone 50. The address confirmation screen b displays the send data (address, name, phone number, etc.) related to the information of the selected specific address.

Figure 8C:
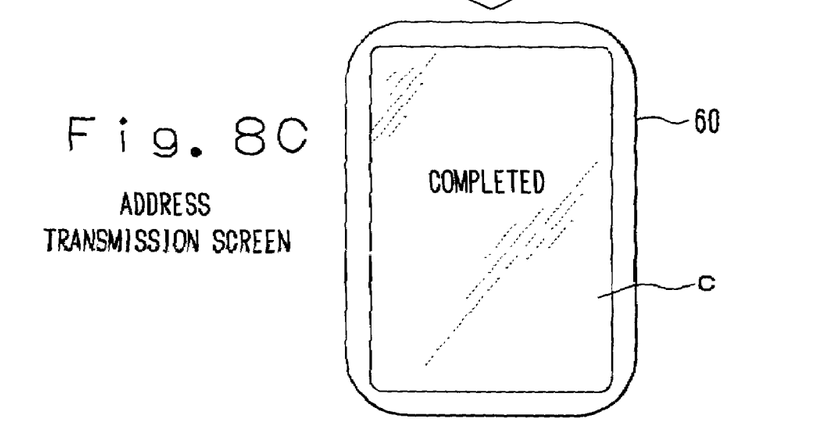

When the send data (address, name, phone number, etc.) related to the information of the selected specific address is confirmed, it is transmitted to the POS terminal 1 from the cellular phone 50, and after the completion of transmission, an address transmission screen c shown in FIG. 8(C) is displayed on the display device 60 of the cellular phone 50. Here, the function of second means (second sub-step) is executed on the cellular phone 50. With the processing mentioned above, the transmission of the send data to the POS terminal 1 from the cellular phone 50 is completed.

When the send data is inputted (Y at step S5: selected data reception means), proceeding to step S6, the inputs of various information such as information concerning the size, the requested date of delivery, and the cover selection of the package are waited.

When the clerk inputted the information concerning the size, the requested date of delivery, and the cover selection of the package and so forth manually through the key operation of the keyboard 9 or the touch panel 13 (Y at step S6), a delivery fare is calculated based on the send data inputted at step S5 and the various information inputted at step S6, and is displayed on the display 8 and on the customer side display 14 (step S7). Here, the function of objective execution means (objective execution step) is executed. Also, the calculation of the delivery fare is executed by searching the fare file that beforehand stores and retains the information concerning the addresses of destinations and the sizes of packages in association with those of the delivery fares, on the basis of the send data inputted at step S5 and the various information inputted at step S6.

With above processing from steps S3 through S7, the registration processing for the send data of the goods delivery service is implemented.

Then, the microcomputer 16 of the POS terminal 1 generates a transaction data of the goods delivery service on the basis of the home delivery order reception data having the registration processing completed as mentioned above, and temporarily stores the data in a buffer of the RAM 20 (step S8).

Then, the clerk transfers the fares, etc., displayed on the home delivery order reception screen P, by confirming the displayed contents on the same screen displayed on the display 8 of the POS terminal 1.

On the other hand, when a key input of a product code through the operation of the keyboard 9 or the bar code scanner 6 (Y at step S2) is detected, the unit price is read from the product master file in the RAM 20 based on the inputted product code, and the number of sales and the amount of sales are stored accumulatively for each product. Then, a registration processing, such as adding sales amount to the sales buffer in the RAM 20, is executed (step S9).

Next, the microcomputer 16 of the POS terminal 1 generates a transaction data with the sales data of the registration processed products, and stores the transaction data in a buffer of the RAM 20 (step S10).

Then, if the total key (not illustrated) on the keyboard 9 is operated (Y at step S11), the microcomputer 16 of the POS terminal 1 will execute the totaling processing of the home delivery order reception data and the product sales data having the registration processing repeated as desired.

Next, in the totaling processing of step S12, the total amount is calculated, which is displayed on the display 8 and on the customer side display 14; and, for example, a change is calculated, the drawer 15 is opened, and the thermal printer 3 prints various information on the receipt.

Then, completing the registration processing as described above, the microcomputer 16 sends the transaction data composed of the product sales data stored in the buffer of the RAM 20, and the transaction data composed of the home delivery order reception data, to the store controller B through the communication I/F 30, and at the same time stores the transaction data composed of the home delivery order reception data in the home delivery order reception file (step S13).

Further, having received the transaction data, the store controller B determines whether the transaction data is a product sales data or a home delivery order reception data by the identification code, and the like. Then, the store controller B temporarily stores the transaction data composed of the product sales data in the RAM, etc., and transfers the transaction data composed of the home delivery order reception data immediately to the host computer. Also, having received the transaction data composed of the home delivery order reception data, the host computer immediately transfers the transaction data composed of the home delivery order reception data to a host computer of the goods delivery service company.

Here, sending a program for displaying the address search screen a to the cellular phone 50, the POS terminal 1 makes the cellular phone 50 display the address search screen a for searching the address book 59, thus allowing the owner to search for the address information while referring to the address search screen a. On the other hand, the cellular phone 50 displays the address search screen a in accordance with the program sent from the POS terminal 1, and makes the owner search for a desired address information from the address book 59, whereby the desired address information of which transmission has been selected by the cellular phone 50 becomes possible to be sent to the POS terminal 1. Thus, the POS terminal 1 is able to receive the address information sent from the cellular phone 50. Thereby, it becomes possible to utilize the address information stored in the address book 59 as the data relating to the destination used for the order receiving operation of the goods delivery service. Accordingly, it becomes possible to save the manual input of addresses, etc., at the POS terminal 1, by acquiring the data relating to the destination used for the order receiving operation of the goods delivery service from the address information stored in the address book 59 of the cellular phone 50, thus shortening the operation time, improving the work efficiency, reducing the mistakes in the stores with the POS terminals 1, and improving the convenience and serviceability for the customers who are also the owners of the cellular phone 50.

Also, in the embodiment, the cellular phone 50 is adopted as a portable electronic terminal, but it is not limited to this, and the so-called portable information terminal, such as a PC notebook, PDA (Personal Digital Assistants), PHS (Personal Handy phone System) can also be adopted.

According to the invention, acquirement of desired data stored in the address data file of a portable electronic terminal by the product sales data processing system will become possible.

According to the invention, it is possible to make the owner of a portable electronic terminal search for a desired data stored in the address data file thereof. Also, when a searched data based on a sent program is transmitted, it will be possible for the product sales data processing system to acquire a desired data stored in the address data file of the portable electronic terminal by the product sales data processing system receiving the data.

According to the invention, while the access from one of the portable electronic terminals is established, the accesses from the other portable electronic terminals are excluded and not to be established, accordingly the portable electronic terminal and the product sales data processing system are able to execute the communication of data in one-to-one relation, whereby the transmission of false data can be prevented to the product sales data processing system.

According to the invention, by limiting the access from the portable electronic terminals to a predetermined business menu operation time, it will be possible to prevent a fraudulent access from a portable electronic terminal to the product sales data processing system.

Obviously, numerous modifications and variations of the present invention are possible in light of the above teachings. It is therefore to be understood that within the scope of the appended claims, the invention may be practiced otherwise than as specifically described herein.

What is claimed is:

1. A data processing method, comprising:
    establishing communications between a point-of-sale (POS) terminal configured to process data corresponding to a goods delivery service and a portable electronic terminal configured to store address data as an address data file provided in a memory of the portable electronic terminal, the address data file configured to hold a plurality of address data, at least one of which identifies a destination address for the goods delivery service;
    displaying, on a display of the portable electronic terminal, a plurality of address data corresponding to the address data file;
    receiving a selection, by a user of the portable electronic terminal, of one of the plurality of displayed address data as a destination address for the goods delivery service;
    transmitting the selected address data from the portable electronic terminal to the POS terminal when the data processing with respect to the goods delivery service is executed while the communications between the POS terminal and the portable electronic terminal is established, the transmitted data identifying the address to which the goods delivery service is requested;
    receiving the address data at the POS terminal from the portable electronic terminal when the data processing with respect to the goods delivery service is executed while the communications between the POS terminal and the portable electronic terminal is established; and
    generating, at the POS terminal, home delivery transaction data based on the received address data and information input to the POS terminal relating to the goods delivery service.

2. A data processing method according to claim 1, further comprising:
    transmitting a program from the POS terminal to the portable electronic terminal, which allows the portable electronic terminal to search and identify the address data in the address data file and transmit the identified address data to the POS terminal, the program configured to be installed in the portable electronic terminal when the data processing with respect to the goods delivery service is executed while the communications between the POS terminal and the portable electronic terminal is established,
    wherein the transmitting a program, further comprises:
        receiving the program at the portable electronic terminal from the POS terminal; and transmitting the identified address data from the portable electronic terminal to the POS terminal according to the program.

3. A data processing method according to claim 1, wherein
the establishing communications allows the portable electronic terminal to access the POS terminal while the POS terminal operates a predetermined business menu.

4. A data processing method according to claim 1, wherein
when communications between the POS terminal and the portable electronic terminal is established, the portable electronic terminal is configured to block communication access from other portable electronic terminals.

5. The method of claim 1, wherein said portable electronic terminal is a cellular phone.

6. A data processing system, comprising:
a point-of-sale (POS) terminal, comprising:
a transceiver configured to establish communications with a portable electronic terminal configured to store address data as an address data file provided in a memory of the portable electronic terminal, the address data file configured to hold a plurality of address data, at least one of which identifies an address for a goods delivery service;
the transceiver further configured to receive selected address data from the portable electronic terminal when the data processing with respect to the goods delivery service is executed while communications between the POS terminal and the portable electronic terminal is established, the transmitted data identifying the address which the goods delivery service is requested;
generating means for generating home delivery transaction data based on the received address data and information input to the POS terminal relating to the goods delivery service;
the portable electronic terminal, comprising:

a display configured to display the plurality of address data corresponding to the address data file;
an interface configured to receive a selection, by a user of the portable electronic terminal, of one of the plurality of displayed address data as a destination address for the goods delivery service;
a transceiver configured to establish communications between the portable electronic terminal and the POS terminal;
the transceiver of the portable electronic terminal configured to transmit the selected address data to the POS terminal when the data processing corresponding to the goods delivery service is executed.

7. A data processing system according to claim 6, wherein
the transceiver of the portable electronic terminal allows the portable electronic terminal to access to the POS terminal while the POS terminal operates a predetermined business menu.

8. A data processing system according to claim 6, wherein
when communications between the portable electronic terminal and the POS terminal is established, the portable electronic terminal is configured to block communications from other portable electronic terminals.

9. A data processing system according to claim 6, wherein
the transceiver of the POS terminal is further configured to transmit a program, which allows the portable electronic terminal to search and identify the address data and the portable electronic terminal is configured to transmit the identified address data to the POS terminal, the program is configured to be installed in the portable electronic terminal when the data processing with respect to the goods delivery service is executed while communications between the POS terminal and the portable electronic terminal is established.

10. The system of claim 6, wherein said portable electronic terminal is a cellular phone.

* * * * *